(12) United States Patent  
Powell et al.

(10) Patent No.: US 6,837,010 B2  
(45) Date of Patent: Jan. 4, 2005

(54) PIN AND COLLAR CONNECTION APPARATUS FOR USE WITH SEISMIC BRACES, SEISMIC BRACES INCLUDING THE PIN AND COLLAR CONNECTION, AND METHODS

(75) Inventors: Steven D. Powell, Park City, UT (US); Argan N. Johnson, Jr., Park City, UT (US); Dennis F. Randall, Salina, KS (US)

(73) Assignee: Star Seismic, LLC, Park City, UT (US)

( * ) Notice: Subject to any disclaimer, the term of this patent is extended or adjusted under 35 U.S.C. 154(b) by 125 days.

(21) Appl. No.: 10/310,692

(22) Filed: Dec. 5, 2002

(65) Prior Publication Data

US 2004/0107654 A1 Jun. 10, 2004

(51) Int. Cl.[7] .................................................. E04B 1/98
(52) U.S. Cl. .................... 52/167.3; 52/167.1; 52/655.1; 52/739.1; 403/217; 403/174
(58) Field of Search ............................. 52/167.1, 167.3, 52/655.1, 653.1, 739.1; 403/181, 217, 169, 170, 174

(56) References Cited

FOREIGN PATENT DOCUMENTS

| JP | 0275825 | * | 11/1988 | ................ 52/167.3 |
| JP | 0108740 | * | 4/1990 | ................ 52/167.3 |
| JP | 403262881 A | * | 11/1991 | ................ 52/167.3 |
| JP | 405009977 A | * | 1/1993 | ................ 52/167.3 |
| JP | 409328813 A | * | 12/1997 | ................ 52/167.3 |

* cited by examiner

Primary Examiner—Kimberly Wood  
(74) Attorney, Agent, or Firm—TraskBritt

(57) ABSTRACT

A nonrigid connection apparatus includes a frame-side member securable to a steel structural frame, a brace-side member securable to a seismic brace, and a coupling element that nonrigidly secures the frame-side and brace-side members to each other. By way of example, the nonrigid connection element may provide a hinge-type connection, which substantially isolates a seismic brace from nonaxial loads. As another example, the nonrigid connection element may be a ball-and-socket type connection, which substantially isolates a seismic brace from nonaxial loads and absorbs any shear and moment applied thereto when the seismic brace drifts out of an intended plane of the steel structural frame. The nonrigid connection element may also include a collar to stabilize the brace-side member and prevent shears and moments from causing the same to buckle in an unintended direction. Methods of installing and using the nonrigid connection apparatus are also disclosed.

9 Claims, 5 Drawing Sheets

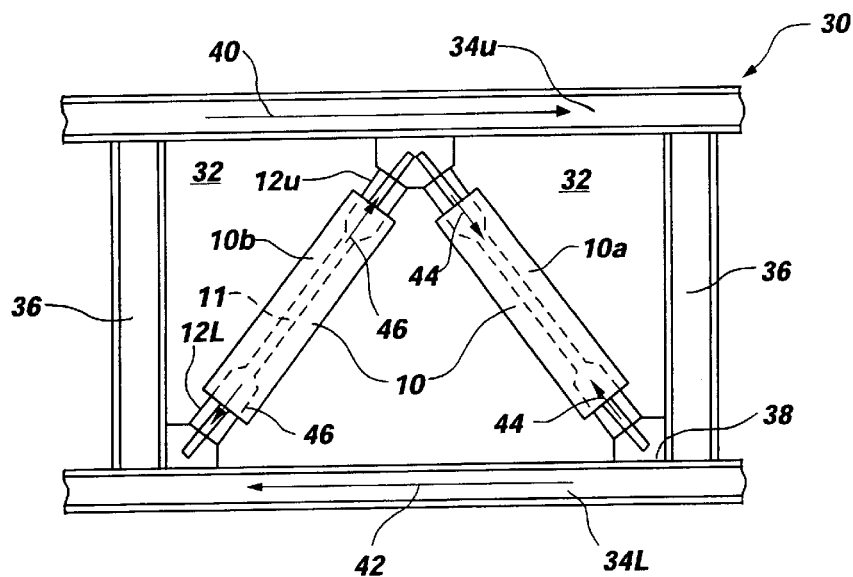
FIG. 1
(PRIOR ART)
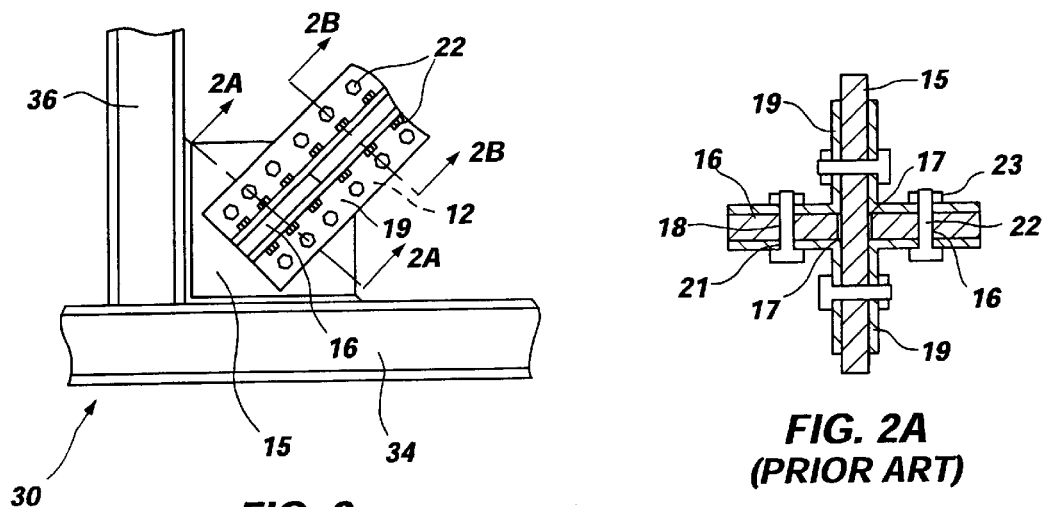
FIG. 2
(PRIOR ART)
FIG. 2A
(PRIOR ART)
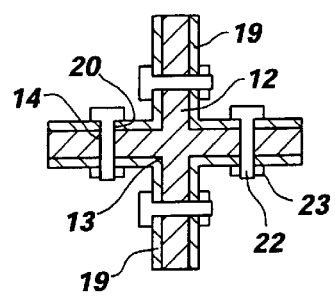
FIG. 2B
(PRIOR ART)

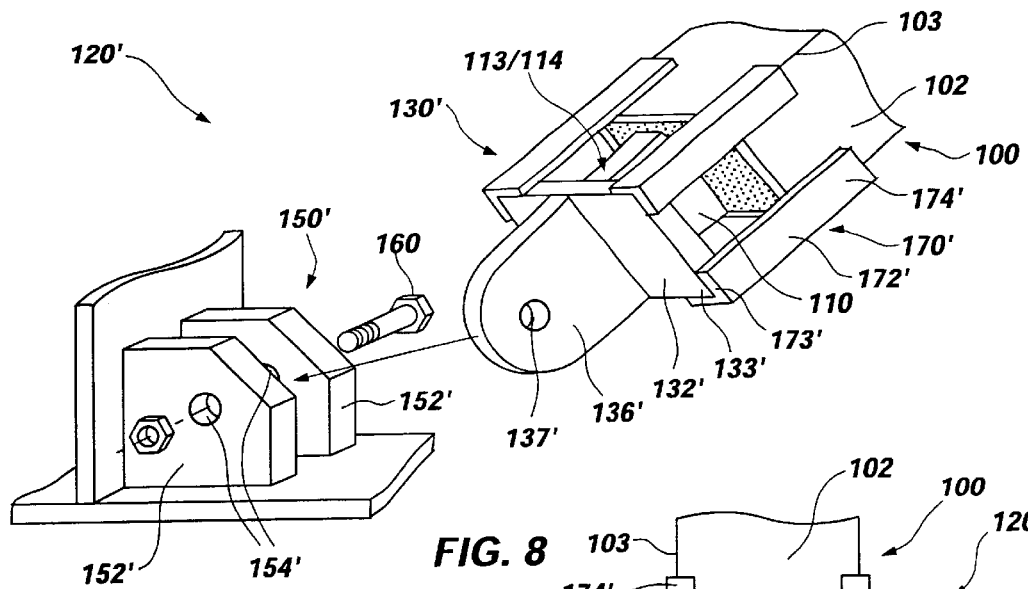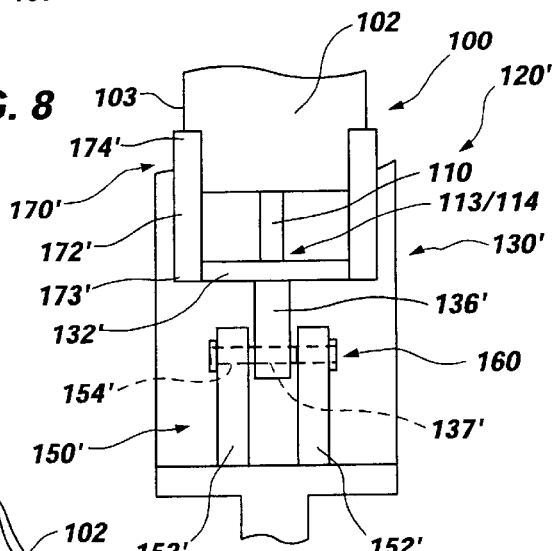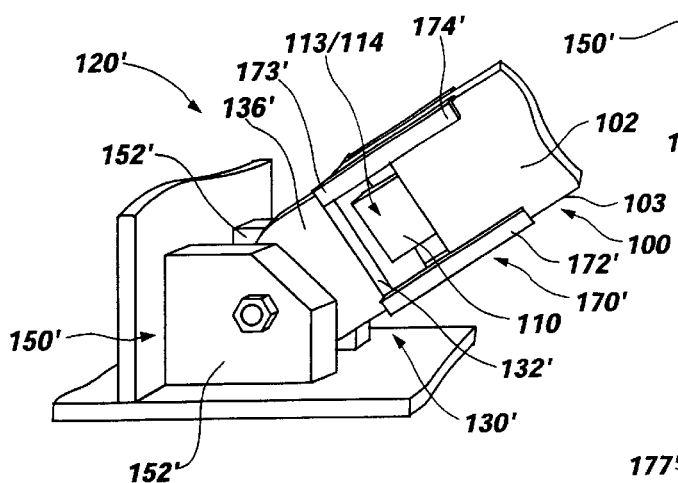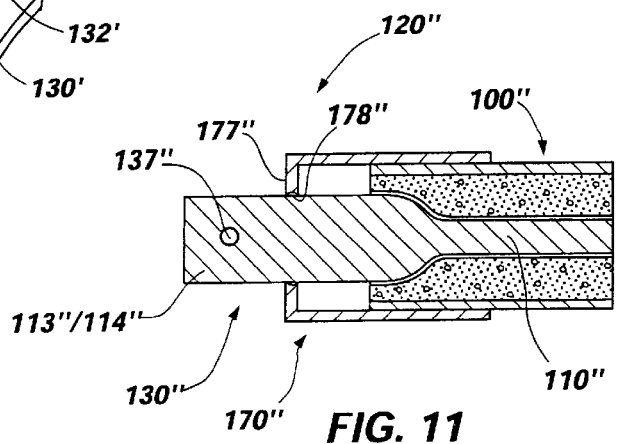

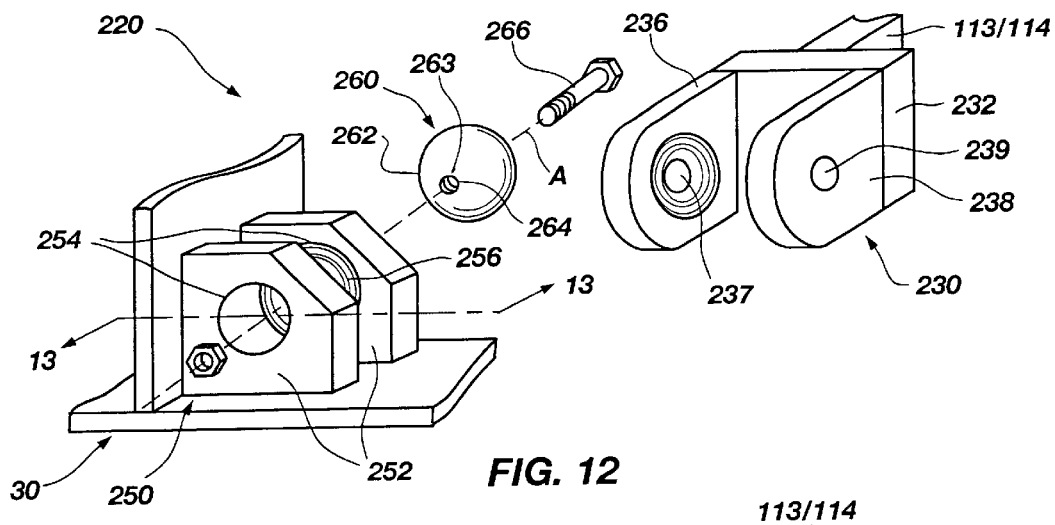
FIG. 12
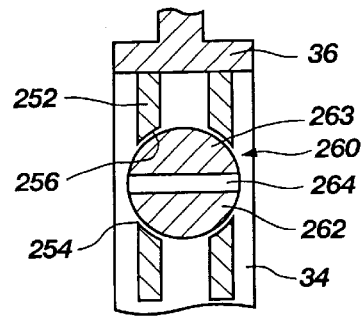
FIG. 13
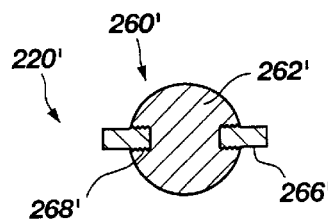
FIG. 14
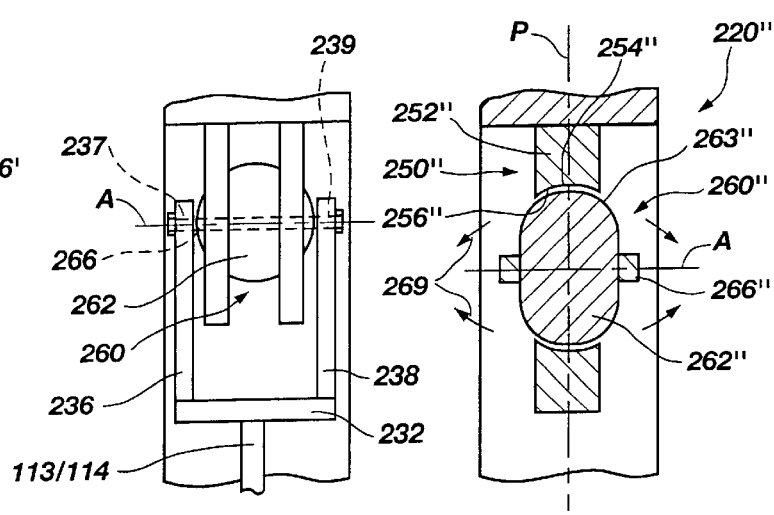
FIG. 15    FIG. 13B

PIN AND COLLAR CONNECTION APPARATUS FOR USE WITH SEISMIC BRACES, SEISMIC BRACES INCLUDING THE PIN AND COLLAR CONNECTION, AND METHODS

BACKGROUND OF THE INVENTION

1. Field of the Invention

The present invention relates generally to connection apparatus for use with seismic braces and, more specifically, to nonrigid connection apparatus for seismic braces. In particular, the present invention relates to connection apparatus which prevent seismic and gravitational loads on steel structural frames from being applied nonaxially to seismic braces. By way of example, the connection apparatus may allow the brace to pivot relative to a structural frame.

2. Background of Related Art

In many areas of the world, particularly seismically active areas, large buildings and other structures may be subjected to seismic loads. In order to prevent structures from being damaged by seismic loads, particularly the vibrations that follow the application of seismic loads to structures, or to at least reduce the amount of damage that seismic loading may cause to such structures, various shock-absorption devices have been developed.

One such shock absorption device, which is useful with steel structural frames, is commonly referred to as a "seismic brace." As shown in FIG. 1, a pair of seismic braces 10 is often arranged within each "bay" 32 of a steel structural frame 30, each bay 32 typically being formed by an adjacent pair of substantially horizontally oriented steel beams 34 (e.g., beams 34u, 34L shown in FIG. 1) and an adjacent pair of substantially vertically oriented steel columns 36. Bottom corners 38 of each bay 32 are formed at junctions between a lower substantially horizontally oriented steel beam 34L and the substantially vertically oriented steel columns 36 at each side of bay 32. Lower ends 12L of seismic braces 10 are typically secured at opposite bottom corners 38 of bay 32. Upper ends 12u of seismic braces 10 are typically secured to an upper substantially horizontally oriented steel beam 34u at adjacent, substantially central locations thereof. As such, the two seismic braces 10 within a bay 32 of steel structural frame 30 are arranged in an inverted "V" configuration. Other, similar arrangements of seismic braces are also known, including "V" configurations, alternative "V" and inverted "V" configurations, a single, diagonally oriented seismic brace 10 in each bay 32 and another, oppositely oriented seismic brace 10 in the next laterally adjacent bay 32 (i.e., such that seismic braces 10 in two adjacent bays 32 form a "V" or inverted "V"), and the like. By arranging seismic braces 10 in this manner, when a seismic, or earthquake, load is applied to the structure of which steel structural frame 30 is a part, typically by shearing bay 32 in the directions of arrows 40 and 42, one seismic brace 10a of a pair will be subjected to a compressive load, depicted by arrows 44, while a tensile load, illustrated by arrows 46, will be applied to the other seismic brace 10b.

Conventionally, seismic braces have been rigidly secured to the beams 34 and/or columns 36 of steel structural frames 30. FIGS. 2 through 2B illustrate an exemplary conventional connection, which includes the use of planar gusset plates 15 that are welded into place relative to a beam 34 and/or a column 36 and which have perpendicular extensions 16 welded to each side thereof. As shown in FIG. 2A, a cross-section taken perpendicular to the planes of both gusset plate 15 and extensions 16 thereof has a generally cruciform shape and, thus, four interior corners 17. Thus, each gusset plate 15 is configured complementarily to the exposed end 12 of a yielding core 11 (FIG. 1) of a seismic brace 10 (FIG. 1), which also typically has a cross-section, taken transverse to the length thereof, that is generally cruciform in shape and, thus, includes four interior corners 13 that extend along the length thereof, as shown in FIG. 2B. The cross-section of an exposed end 12 of a yielding core 11 of a seismic brace 10 and the corresponding features of the cross-section taken through gusset plate 15 and extensions 16 thereof may have substantially the same dimensions. A rigid connection between these two elements is typically effected by way of intermediate securing elements 19, which are typically referred to as "splice plates," positionable across portions of both an exposed end 12 and a gusset plate 15/extension 16, within corresponding interior corners 13 and 17. Each intermediate securing element 19 includes apertures 20, 21 formed therethrough, which respectively align with corresponding apertures 14 formed through exposed ends 12 of yielding core 11 and apertures 18 formed through gusset plate 15 and extensions 16 therefrom. Apertures 14, 18, 20, and 21 are typically configured to receive bolts 22, which, along with complementarily threaded nuts 23, secure intermediate securing elements 19 in place with respect to both gusset plates 15 and exposed ends 12 of yielding core 11, thereby securing seismic braces 10 into place relative to steel structural frame 30.

A seismic brace 10 (FIG. 1) is secured to a steel structural frame 30 by aligning exposed ends 12 of a yielding core 11 (FIG. 1) of each seismic brace 10 with a corresponding gusset plate 15 that has already been secured to one or more of a beam 34 and/or a column 36 of steel structural frame 30, as well as with extensions 16 that have been secured to that gusset plate 15. Intermediate securing elements 19 are then positioned within interior corners 13 and 17, then bolted (e.g., with bolts 22 and complementarily threaded nuts 23) to gusset plate 15, extensions 16 therefrom, and exposed end 12. As shown, the connection of exposed ends 12 to gusset plate 15 is typically established by way of four intermediate securing elements 19 which have L-shaped cross-sections, taken transverse to the lengths thereof.

Referring again to FIG. 1, in addition to applying loads axially to seismic braces as a result of the shear generated by seismic and gravitational loads, rigid connections of this type typically transfer additional shears and moments, which are generated as a seismic brace 10 drifts laterally. Application of shear and moment to a yielding core 11 of a seismic brace 10 along vectors which are not located in a plane of bay 32 undesirably causes a bending moment and shear stress to be applied to yielding core 11, which, along with compressive loads applied thereto, results in a so-called "combined stress" that is greater on one side of yielding core 11 than on the other and that may cause seismic brace 10 to buckle in an unintended direction. When such buckling occurs, seismic brace 10 is no longer useful for either shock absorption or structural support.

Thus, a connection apparatus which substantially isolates a seismic brace from nonaxially oriented loads, as well as that reinforces or isolates the seismic brace from shears and moments that occur as a seismic brace drifts from a plane of a bay of a steel structural frame in which the seismic brace is located, would be an improvement over the existing art of which the inventors are aware.

SUMMARY OF THE INVENTION

A nonrigid connection apparatus according to the present invention includes a first member, or frame-side member, which is configured to be rigidly secured to a structural frame, a second member, or brace-side member, which is configured to be secured to a core member of a seismic brace, and a coupling member. The frame-side member and brace-side member both include nonrigid coupling elements which are configured to receive or to be received by complementary portions of the connection member.

In an exemplary embodiment, the frame-side member of the inventive nonrigid connection apparatus may comprise a substantially planar gusset plate. The gusset plate of the frame-side member is configured to be welded into a corner formed at a junction between two structural steel frame members. The gusset plate includes an aperture, which is substantially circular in shape, formed therethrough. The brace-side member may include two knife plates which are spaced apart from one another a sufficient distance that the gusset plate may be interleaved therewith. Both elements of the brace-side member also include apertures, which are in alignment with one another and alignable with the aperture of the frame-side member. The apertures of the elements of the brace-side member may have substantially the same size and configuration (e.g., substantially circular) as the aperture of the frame-side member. Upon assembly of the frame-side and brace-side members with the apertures in substantial alignment, the coupling member, which may have a substantially cylindrical central section, may be introduced into the apertures and secured in place relative to the frame-side and brace-side members, thereby nonrigidly coupling the frame-side and brace-side members of the nonrigid connection apparatus to one another.

The coupling member of the nonrigid connection apparatus may be held in place by way of enlarged heads at the ends thereof, bent regions at the ends thereof, securing elements that extend through apertures near the ends thereof, transversely to the length of the coupling member (e.g., like cotter pins), or by other position-retaining means.

The knife plates of the brace-side member are secured in place relative to a load-bearing member, or "core," of a seismic brace. For example, the knife plates may be welded directly to the core or to an intermediate member which is, in turn, welded to the core. These arrangements facilitate the positioning of an end of a yielding core closer to the structural steel frame than do conventional, rigid connections, which typically consume a significant portion of the fixed distance between brace connection locations. Thus, nonrigid connection apparatus according to the present invention may facilitate the use of seismic braces which include yielding cores that are longer than the yielding cores of conventional seismic braces that may be used at the same location of a structural steel frame. As is well known in the art, an increase in the length of a yielding core means that the strain rate on the yielding core will be less, resulting in a fatigue life which is longer than the fatigue life of a similar brace secured at a similar location using conventional, rigid connection apparatus.

Additionally, a nonrigid connection apparatus according to the present invention may include a collar with one or more members that extend over a junction between the brace-side member and the end of a seismic brace on which the nonrigid connection apparatus is used. By way of example only, a first end of each member of a collar may be secured to one or both of a portion of the brace-side member (e.g., the knife plates or intermediate member) or to the core of a seismic brace with which the nonrigid connection apparatus is used, while a second end of each collar member may be positioned adjacent to an external shell, or shell, sleeve, or tube exterior, or other exterior surface of the seismic brace. The collar may be permitted to slide longitudinally relative to the external sleeve as the yielding core is compressed and elongated. It is currently preferred that at least a portion of the collar member extend over and substantially parallel to an end portion of the external shell or other exterior surface of the seismic brace.

Such a nonrigid connection apparatus may be used with a variety of types of compression and tension-type seismic braces, including those with single, somewhat planar yielding cores, as well as those with multiple cores. The collar of the nonrigid connection apparatus may also be used with other types of connection apparatus, including known, rigid connection apparatus for seismic braces. The collar is particularly useful with seismic braces that include axial-load-bearing cores that are surrounded by buckling-limiting material encased by external sleeves.

In another embodiment, the frame-side member of a nonrigid connection apparatus according to the present invention may include a pair of gusset plates, while the brace-side member of such a nonrigid connection apparatus comprises an exposed end of a core of a seismic brace or an extension therefrom which is rigidly secured thereto. The gusset plates of the frame-side member are configured to be secured to a steel structural frame in spaced-apart relation to one another and oriented substantially parallel to each other, with an aperture formed through each gusset plate being in substantial alignment with an aperture of the other gusset plate. The brace-side member is configured to be positioned between the gusset plates such that an aperture thereof substantially aligns with the substantially aligned apertures of the gusset plates. Upon arranging and assembling the frame-side and brace-side members in this manner, a coupling member, such as an elongate member with a substantially cylindrical center section (e.g., a pin, bolt, etc.), may be introduced into the substantially aligned apertures.

Of course, other arrangements and configurations of apparatus for nonrigidly connecting seismic braces to steel structural frames are also within the scope of the present invention. For example, another embodiment of nonrigid connection apparatus that incorporates teachings of the present invention may comprise a ball-and-socket type connection apparatus. The first member, or frame-side member, of such a connection apparatus, which is securable to a steel structural frame, may comprise a socket. The socket may, for example, be in the form of an aperture with a concave edge. The coupling member of such a connection apparatus may comprise a ball, which may be spherical in shape, an oblong spheroid, disc-shaped, or otherwise configured to fit within the socket of the frame-side member and rotate somewhat relative to the frame-side member. The coupling member may also include one or more pins protruding from opposite sides thereof. The second member, or brace-side member, of a ball-and-socket type connection apparatus includes a pair of substantially planar members which are spaced apart a sufficient distance that the ball of the coupling member may be positioned therebetween. An aperture formed through each substantially planar member is configured to receive a portion of a pin protruding from the ball and, thus, facilitates hinged movement of the brace-side member and of a seismic brace to which the brace-side member is secured relative to one or both of the ball and the frame-side member of the connection apparatus.

In use, the frame-side member of a nonrigid connection apparatus of the present invention is secured to a steel structural frame, such as in a corner formed between conjoined horizontal beams and vertical steel columns. Continuing with the above examples, this may be effected by welding or otherwise securing one or more gusset plates into such a corner. The brace-side member of the nonrigid connection apparatus, which, preferably, has already been secured to or formed at the end of a core of a seismic brace, is then positioned appropriately relative to the frame-side member, such that apertures of the frame-side and brace-side members are substantially mutually aligned. A coupling member is then introduced into the aligned apertures so as to be positioned within each of the substantially aligned apertures of the frame-side and brace-side members. The coupling member is then secured in this position to prevent inadvertent removal thereof from the apertures. The opposite end of the seismic brace may then be similarly secured to another (higher or lower) horizontally extending steel beam. Alternatively, another type of connection, including a rigid, conventional connection, may be used to secure the other end of the seismic brace to the other horizontally extending beam. As a single pin is secured in position rather than several bolts, as required by conventional, rigid connection apparatus, erection of a seismic brace that includes a nonrigid connection apparatus according to the present invention is simpler and faster than erection with conventional, rigid connection apparatus.

When a building that includes a frame with one or more seismic braces connected thereto by way of a nonrigid connection apparatus of the present invention is subjected to a load, such as that generated by shock waves (e.g., seismic shock waves, high winds, etc.), the nonrigid connection apparatus and the adjacent end of the seismic brace are substantially isolated from external moments that result from movement of the seismic brace out of the plane of the bay of a steel structural frame in which the seismic brace is located. The collar resists in-plane and out-of-plane moments on the exposed portions of the core of the seismic brace, as well as of the remainder of the nonrigid connection apparatus, thereby permitting only substantially axial loads to be applied to the core, providing support to the core and the remainder of the nonrigid connection apparatus, and preventing weak axis buckling of the core. In addition, the nonrigid connection apparatus reduces the moments and shears that result from the application of gravity and earthquake loads to a steel structural frame by providing a larger moment of inertia at the ends of the core of a seismic brace. As a result, the nonrigid connection element substantially limits the forces that are applied to the seismic brace to those which may be properly absorbed thereby.

As a further result of providing a nonrigid connection, the likelihood of a nonrigid connection apparatus according to the present invention being damaged when subjected to gravity and earthquake loads is much lower than the likelihood of a conventional rigid connection being damaged. Thus, following failure due to absorption of excessive earthquake loads, a seismic brace which is at least partially secured to a steel structural frame by way of one or more of the inventive nonrigid connection apparatus may still have some load-bearing capabilities and, thus, provide some structural support to a steel structural frame, whereas seismic braces that are secured in place by weakened conventional rigid connections would be less likely to provide such support.

Other features and advantages of the present invention will become apparent to those of ordinary skill in the art through a consideration of the ensuing description, the accompanying drawings, and the appended claims.

BRIEF DESCRIPTION OF THE DRAWINGS

In the drawings, which illustrate various features of exemplary embodiments of the present invention:

FIG. 1 is a schematic representation of a bay of a steel structural frame with a pair of seismic braces, which are positioned within the bay in a conventional fashion, coupled to the steel structural frame;

FIG. 2 depicts an example of a conventional rigid connection between a steel structural frame and an exposed end of a yielding core of a seismic brace;

FIG. 2A is a cross-section taken along line 2A—2A of FIG. 2;

FIG. 2B is a cross-section taken along line 2B—2B of FIG. 2;

FIG. 8 is a perspective assembly view of another embodiment of nonrigid connection apparatus according to the present invention;

FIG. 9 is a perspective view of the nonrigid connection apparatus shown in FIG. 8;

FIG. 10 is a top view of the nonrigid connection apparatus of FIGS. 8 and 9;

FIG. 11 is a cross-sectional representation of a brace-side member of yet another embodiment of nonrigid connection apparatus according to the present invention;

FIG. 12 is a perspective assembly view of a ball-and-socket embodiment of nonrigid connection apparatus incorporating teachings of the present invention, which includes a coupling element comprising a ball;

FIG. 13 is a cross-section taken along line 13—13 of FIG. 12;

FIG. 13A a cross-sectional representation of a variation of the coupling element of the nonrigid connection apparatus shown in FIGS. 12 and 13;

FIG. 13B is a cross-sectional representation of another variation of the coupling element of the nonrigid connection apparatus shown in FIGS. 12 and 13, which comprises a disc rather than a ball;

FIG. 14 is a side view of the nonrigid connection apparatus of FIGS. 12 and 13;

FIG. 15 is a top view of the nonrigid connection apparatus of FIGS. 12 through 14;

DETAILED DESCRIPTION

Figure 3:
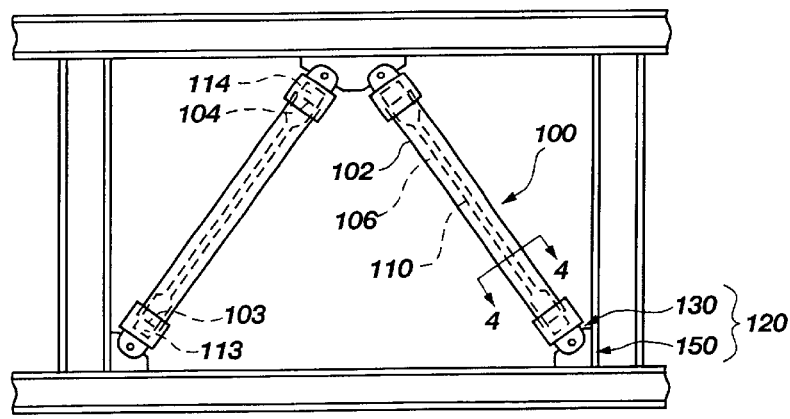
FIG. 3 is side view of an example of a seismic brace with which a nonrigid connection apparatus that incorporates teachings of the present invention may be used, as well as an exemplary embodiment of nonrigid connection apparatus.
Figure 4:
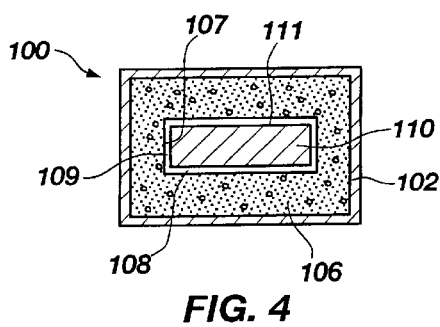
FIG. 4 is a cross-section taken through line 4—4 of FIG. 3.

With reference to FIGS. 3 and 4, a seismic brace 100 that incorporates teachings of the present invention is depicted. In the illustrated example, seismic brace 100 is a single-core, compression and tension member which includes an elongate, substantially hollow exterior shell 102, a buckling-limiting member, which is also referred to herein as "containment 106," within exterior shell 102, and an elongate yielding core 110 positioned substantially centrally within and extending completely along the length of containment 106. The depicted yielding core 110 has a rectangular, somewhat planar cross-section, taken transverse to the length thereof, and includes ends 113 and 114 which extend beyond corresponding ends 103, 104 of exterior shell 102. Yielding core 110 is positioned within an aperture 108 that extends substantially through containment 106 and includes at least one surface 111 which is spaced apart from an interior surface 107 of containment 106 by way of a readily compressible medium 109, such as a polymer, air, or the like. Although FIG. 3 depicts a particular embodiment of seismic brace 100, which comprises a single-core member that may be subjected to compressive and tensile loads, other types of seismic braces, including all-steel seismic braces which lack a buckling-limiting member, may also be used in accordance with teachings of the present invention.

With continued reference to FIG. 3, a brace-side member 130 of an exemplary embodiment of nonrigid connection apparatus 120 according to the present invention is located at at least one end 113, 114 of yielding core 110. Brace-side member 130 is also referred to herein as a second member, or simply as a member, of nonrigid connection apparatus 120 and as a nonrigid connection element.

Figure 5:
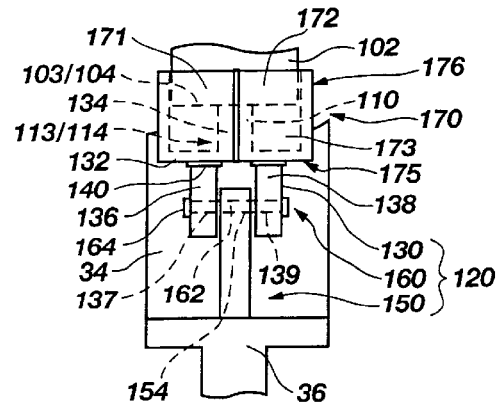
FIG. 5 is a side view of the embodiment of nonrigid connection apparatus shown in FIG. 3.

As shown in FIG. 5, brace-side member 130 includes an intermediate member, in this case an end plate 132, which is secured to end 113, 114 of yielding core 110, such as by welds 134. Brace-side member 130 also includes two knife plates 136 and 138 secured to and extending from end plate 132 in mutually parallel relation. Welds 140 or other known fixing means may secure knife plates 136 and 138 to end plate 132. As shown, knife plates 136 and 138 may extend in substantially the same direction as seismic brace 100 (FIGS. 3 and 4) and may be oriented substantially perpendicular to end plate 132.

Figure 6:
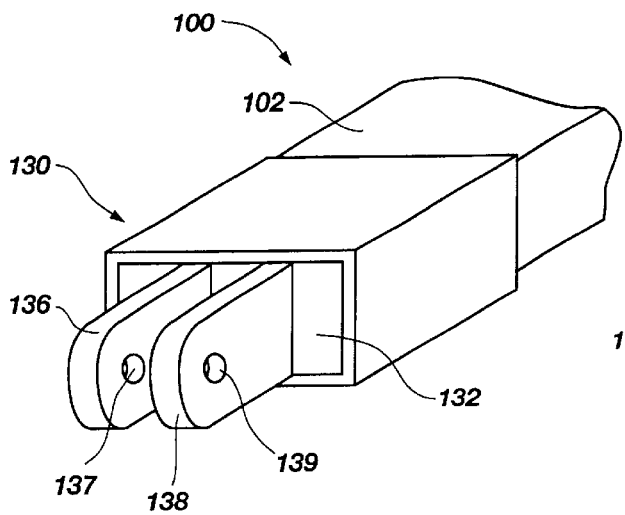
FIG. 6 is a perspective view of a brace-side member of the nonrigid connection apparatus of FIGS. 3 and 5.

Turning to FIG. 6, each knife plate 136, 138 of brace-side member 130 of nonrigid connection apparatus 120 (FIGS. 3 through 5) includes an aperture 137, 139, respectively formed therethrough. Apertures 137 and 139, which are both configured to receive a central portion 162 (FIG. 5) of a coupling member 160 (FIG. 5) of nonrigid connection apparatus 120, are in substantial alignment with one another.

With briefly returned reference to FIG. 3, knife plates 136 and 138 of brace-side member 130 are spaced a sufficient distance apart from one another that a corresponding feature (e.g., gusset plate 152 of FIG. 7) of a frame-side member 150 of nonrigid connection apparatus 120 may be positioned therebetween.

Figure 7:
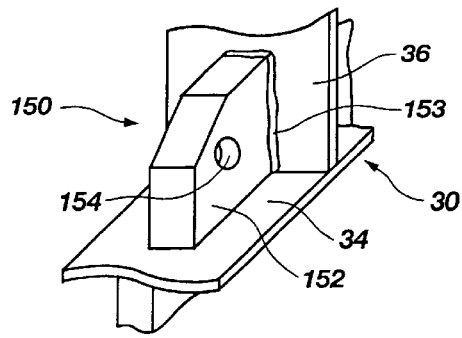
FIG. 7 is a perspective view of a frame-side member of the nonrigid connection apparatus of FIGS. 3 and 5.

As depicted in FIG. 7, an exemplary embodiment of a frame-side member 150 of nonrigid connection apparatus 120 (FIGS. 3 through 5) is shown. Frame-side member 150 is also referred to herein as a first member, or simply as a member, of connection apparatus 120 or as a nonrigid connection element. The illustrated frame-side member 150 comprises a single, substantially planar gusset plate 152, which is configured to be fixed in place relative to a member of a steel structural frame 30, such as one or more of a conjoined beam 34 and/or column 36 thereof. While gusset plate 152 is shown in the illustrated example as being secured in a corner formed at a junction between a horizontally oriented beam 34 and a vertically oriented column 36, gusset plate 152 may be secured to any suitable surface (i.e., within a bay 32 of steel structural frame 30) of a single beam 34 or column 36. Also, while FIG. 7 depicts gusset plate 152 as being held in place by welds 153, other fixing means for securing gusset plate 152 into position (e.g., rivets, bolts, etc., for securing gusset plate 152 to a lip (not shown) protruding from beam 34 and column 36) are also within the scope of the present invention.

The dimensions of gusset plate 152 and the type of fixing means used to secure the same to a steel structural frame 30, including the height, length, and thickness thereof, are configured to withstand predetermined amounts of load, moment, and other stresses. Accordingly, the dimensions of gusset plate 152 depend at least partially upon the material (e.g., the type of steel) from which gusset plate 152 is fabricated, as well as the size of seismic brace 100 (FIG. 3) to be used therewith, the location of a steel structural frame 30 at which seismic brace 100 is to be used, and other factors, as known in the art.

Gusset plate 152 of frame-side member 150 of connection apparatus 120 includes an aperture 154 therethrough. Aperture 154 may have substantially the same internal crosswise dimensions (e.g., radius) as apertures 137 and 139 (FIG. 6) of substantially planar knife plates 136 and 138, respectively, of brace-side member 130 of nonrigid connection apparatus 120. Upon positioning substantially planar knife plates 136 and 138 on opposite sides of a gusset plate 152 which has been fixed into position relative to a steel structural frame 30 into an appropriate assembled relationship, apertures 137 and 139 of substantially planar knife plates 136 and 138, respectively, are in substantial alignment with aperture 154 of gusset plate 152.

Referring again to FIG. 5, apertures 137, 139, and 154 are sized and configured to receive a central portion 162 of a coupling member 160 of nonrigid connection apparatus 120. When positioned within apertures 137, 139, and 154 of assembled brace-side and frame-side members 130 and 150, respectively, coupling member 160 nonrigidly couples brace-side member 130 and frame-side member 150 in the assembled relationship thereof. In this case, the nonrigid coupling is a hinged connection, at which movement may occur in substantially a single plane and at a substantially single pivot point.

Coupling member 160 is held in place within apertures 137, 139, and 154 by position-retaining elements 164, such as enlarged heads or nuts at the ends thereof, bent regions at the ends thereof, securing elements that extend through apertures near the ends thereof, transversely to the length of the coupling member 160 (e.g., like cotter pins), or the like. Of course, combinations of different types of position-retaining elements 164 may be used to secure a coupling member 160 into place relative to frame-side member 150 and brace-side member 130 of nonrigid connection apparatus 120.

With continued reference to FIG. 5, a support collar 170 is also depicted. Support collar 170 includes a distal end 175, which is configured to be positioned at or near brace-side member 130 of nonrigid connection apparatus 120, and a proximal end 176, which is configured to extend at least partially over an end 103, 104 of exterior shell 102. Proximal end 176 of support collar 170 may be permitted to slide relative to a length of exterior shell 102. As proximal end 176 of support collar 170 is to be positioned over an end 103, 104 of exterior shell 102, at least the portion of a hollow center 173 thereof which is to receive an end 103, 104 of exterior shell 102 has internal dimensions which are roughly the same as or slightly greater than the corresponding external dimensions of that end 103, 104. When properly positioned over an end 113, 114 of a yielding core 110 of a seismic brace 100 (FIGS. 3 and 4), support collar 170 substantially isolates yielding core 110 from external shear and moment, instead absorbing some of the external shear and moment and transmitting external shear and moment to exterior shell 102. Thus, such positioning of seismic brace 100 isolates ends 113, 114 against loads that are placed transversely on seismic brace 100 with respect to the axis or length thereof.

The exemplary support collar 170 which is shown in FIG. 5 includes first and second halves 171 and 172, respectively. When assembled, first half 171 and second half 172 form an elongate structure with a substantially rectangular cross-section taken transverse to the length of the assembled support collar 170 and a hollow center 173. First half 171 and second half 172 may be secured to one another by any suitable fixing means, including, without limitation, welds, rivets, nuts and bolts, and the like. As an alternative to the depicted embodiment of support collar 170, support collar 170 may comprise a single piece. Other variations of support collars that incorporate teachings of the present invention and, thus, that are within the scope of the present invention include support collars with more than two pieces. Also, support collars that include a plurality of elements which are not secured directly to one another but, rather, which are secured to a seismic brace 100 (FIGS. 3 and 4) and a brace-side member 130 of a nonrigid connection apparatus 120 are within the scope of the present invention.

FIGS. 8 through 10 depict another exemplary embodiment of nonrigid connection apparatus 120' according to the present invention.

As shown in FIGS. 8 through 10, a brace-side member 130' of nonrigid connection apparatus 120' includes a single, knife plate 136' with an aperture 137' formed therein. Knife plate 136' may be secured, by appropriate fixing means, to an intermediate member, such as an end plate 132', that has been secured to an end 113, 114 of a yielding core 110 of a seismic brace 100. Alternatively, knife plate 136' may be secured directly to end 113, 114.

Frame-side member 150' of nonrigid connection apparatus 120' includes two substantially planar gusset plates 152'. Each gusset plate 152' includes an aperture 154' formed therethrough. Gusset plates 152' of frame-side member 150' are spaced apart from one another and oriented in substantially parallel relation to one another with apertures 154' thereof in substantial axial alignment. The spacing between gusset plates 152' is sufficient to permit the insertion of knife plate 136' therebetween.

When knife plate 136' is positioned between gusset plates 152' in an appropriate assembled relationship thereof, aperture 137' of knife plate 136' and apertures 154' of gusset plates 152' are in substantial axial alignment with one another. Accordingly, a coupling member 160 of nonrigid connection apparatus 120' may be introduced into apertures 137' and 154' and secured in place relative to both brace-side member 130' and frame-side member 150' of nonrigid connection apparatus 120', as described previously herein with reference to FIG. 5.

FIGS. 8 and 9 depict another exemplary support collar 170' that may be used with nonrigid connection apparatus 120' or any other embodiment of nonrigid connection apparatus that incorporates teachings of the present invention. Support collar 170' includes four elongate members 172', with cross-sections taken transverse to the length thereof having an "L" shape. A first end 173' of each elongate member 172' is secured (e.g., by welds or other suitable fixing means) to a corner 133' of end plate 132', while an opposite, second end 174' of each elongate member 172' is secured to an end 103 of exterior shell 102. As there are four elongate members 172' in the depicted example, one elongate member 172' extends between each corner 133' of end plate 132' and a corresponding end 103 of exterior shell 102.

In another, similar embodiment of nonrigid connection apparatus 120", shown in FIG. 11, brace-side member 130" comprises an end 113", 114" of yielding core 110" of seismic brace 100". An aperture 137" formed through end 113", 114" is configured to receive a central portion 162 (FIG. 5) of a coupling member 160 of nonrigid connection apparatus 120".

A frame-side member 150' of nonrigid connection apparatus 120" is the same as that shown and described previously herein with reference to FIGS. 8 through 10 and, thus, includes a pair of gusset plates 152'. Gusset plates 152' of frame-side member 150' are arranged substantially parallel to one another with apertures 154' thereof in substantial axial alignment and are spaced apart a sufficient distance that end 113", 114" of yielding core 110" may be positioned therebetween. Upon positioning end 113", 114" between gusset plates 152' and substantially axially aligning aperture 137" with apertures 154', coupling member 160 may be placed within the substantially aligned apertures 154' and 137" so as to nonrigidly connect end 113", 114" to frame-side member 150', as described previously herein with reference to FIGS. 5 and 8 through 10. Coupling member 160 may then be secured in place, as described previously herein with reference to FIGS. 5 and 8 through 10.

A support collar 170" which is configured to be used with brace-side member 130" includes an end plate 177" with a slot 178" formed therethrough to receive end 113", 114" of yielding core 110". End plate 177" is positioned at an intermediate location along end 113", 114" of yielding core 110".

In addition to being useful with nonrigid connection apparatus of the types described herein, support collars (e.g., support collar 170, 170', 170") that incorporate teachings of the present invention may also be used with other types of connection apparatus, including other nonrigid connection apparatus, as well as the nonrigid connection apparatus (e.g., gusset plate bolted to brace ends with cross-sections taken along the lengths thereof that are cruciform in shape).

Another exemplary embodiment of nonrigid connection apparatus 220 that incorporates teachings of the present invention is depicted in FIGS. 12 through 15.

As shown in FIG. 12, nonrigid connection apparatus 220 includes a brace-side member 230, which is configured to be secured to a seismic brace 100 (FIGS. 3 and 4), and a frame-side member 250, which is configured to be secured to a steel structural frame. Nonrigid connection apparatus 220 also includes a coupling member 260, which nonrigidly secures brace-side member 230 to frame-side member 250 and, thus, a seismic brace 100 to a steel structural frame 30. As depicted, nonrigid connection apparatus 220 comprises a ball-and-socket type joint, with frame-side member 250 comprising the socket, coupling member 260 comprising the ball, and brace-side member 230 being pivotally secured to the ball of coupling member 260.

As shown in FIGS. 12 and 13, frame-side member 250 may comprise a pair of substantially planar gusset plates 252 with large apertures 254 formed therein. Each aperture 254 includes a concave edge 256, the curvature of which is configured to complement at least a portion of an exterior surface of coupling member 260 so as to retain coupling member 260 within aperture 254. Of course, the thickness of gusset plate 252, the sizes of apertures 254, and the curvatures of concave edges 256 may be configured to retain coupling member 260 under seismic and gravitational loads and, thus, when tensile and compressive loads are being applied to seismic brace 100 (FIGS. 3 and 4).

Gusset plate 252 may be secured to one or more of a beam 34 and a column 36 of a steel structural frame 30 as known in the art, such as by welds, nuts and bolts, rivets, or the like.

FIGS. 12 and 13 illustrate coupling member 260, which includes a ball 262. As shown, ball 262 is spheroid in shape, comprising a sphere, although oblong spheroids are also within the scope of the present invention, as are spheres and spheroid structures that have substantially opposite planar surfaces. Ball 262 is configured to be introduced into aperture 254 of frame-side member 250 in such a way that an engaging region 263 of ball 262 is engaged by concave edges 256 of apertures 254, between gusset plates 252 and, thus, retained at least partially within apertures 254.

The exemplary coupling member 260 depicted in FIGS. 12 and 13 also includes an aperture 264 extending axially through ball 262, as well as an elongate pin 266 positioned within aperture 264 so as to extend completely through ball 262 and to protrude from opposite sides thereof. Alternatively, as shown with respect to coupling member 260' of nonrigid connection apparatus 220' in FIG. 13A, two pins 266' may be secured to opposite sides of a ball 262' (e.g., by threadingly engaging apertures 268' in opposite sides of ball 262', as shown, by welds, etc.).

Of course, variations of coupling members are also within the scope of the present invention, including, without limitation, coupling member 260" depicted in FIG. 13B, which includes a disc-shaped element 262" with a coupling portion comprising a rounded ridge 263" extending around at least a portion of the outer circumference thereof. Rounded ridge 263" is configured to be engaged by a concave edge 256" of an aperture 254" of frame-side member 250" of nonrigid connection apparatus 220" in such a way that disc-shaped element 262" may at least partially rotate about its axis A within aperture 254", as well as move laterally, into and out of a plane P in which gusset plate 252" is located, as shown by arrows 269.

Like coupling members 260 and 260', coupling member 260" may include one or more pins 266" protruding from opposite sides of disc-shaped element 262". As shown, each pin 266" may be positioned so as to extend substantially along axis A of disc-shaped element 262".

With returned reference to FIG. 12, as well as reference to FIGS. 14 and 15, brace-side member 230 of nonrigid connection apparatus 220 may be configured substantially as brace-side member 130 described above with reference to FIGS. 3 through 6. Thus, brace-side member 230 may include an end plate 232, which is secured to end 113, 114 of yielding core 110 (FIGS. 3 and 4), to which two knife plates 236 and 238 are secured. Knife plates 236 and 238 extend from end plate 232 in mutually parallel relation. As shown, knife plates 236 and 238 may extend in substantially the same direction as seismic brace 100 (FIGS. 3 and 4) and may be oriented substantially perpendicular to end plate 232. Knife plates 236 and 238 are spaced a sufficient distance apart from one another that frame-side member 250 and ball 262, 262' or disc-shaped element 262" of a respective coupling member 260, 260', 260" may be positioned therebetween.

Each knife plate 236, 238 of brace-side member 230 of nonrigid connection apparatus 220 includes an aperture 237, 239 formed therethrough. Apertures 237 and 239 are both configured to receive a portion of a pin 266, 266', 266" (FIGS. 13, 13A, and 13B, respectively) of a complementary coupling member 260, 260', 260" in such a way that brace-side member 230 and, thus, a seismic brace 100 to which brace-side member 230 is secured, may pivot about an axis A defined by pins 266, 266', 266".

As is apparent from the foregoing description, nonrigid connection apparatus 220, 220', 220" allow a seismic brace 100 to pivot relative to frame-side member 250 in more than one plane. Accordingly, nonrigid connection apparatus 220, 220' and 220" substantially isolate seismic brace 100 from shear, moment, and loads that are nonaxial to seismic brace 100.

Figure 17:
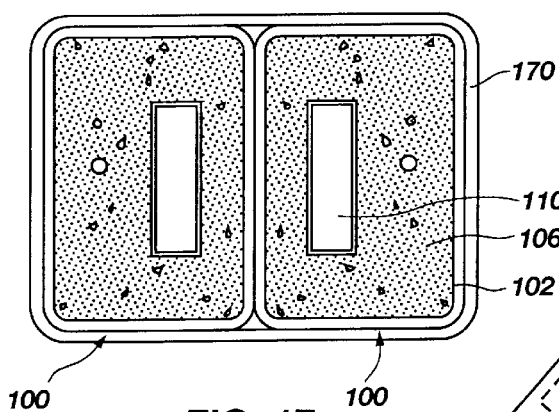
FIGS. 17–19 are cross-sectional representations of various examples of multiple-brace arrangements that may be used as shown in FIG. 16.
Figure 16:
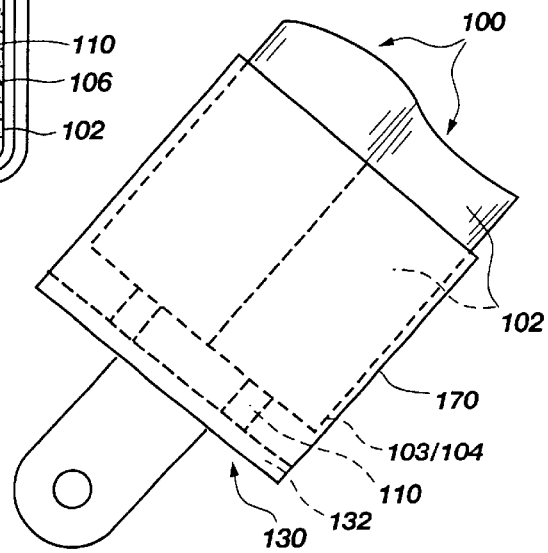
FIG. 16 is a side view of an example of use of the brace-side member of the nonrigid connection apparatus depicted in FIGS. 3–7 with a plurality of seismic braces.
Figure 18:
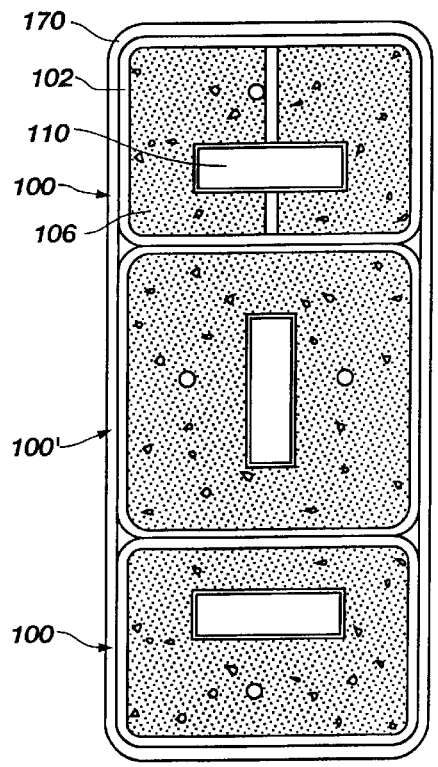
Figure 19:
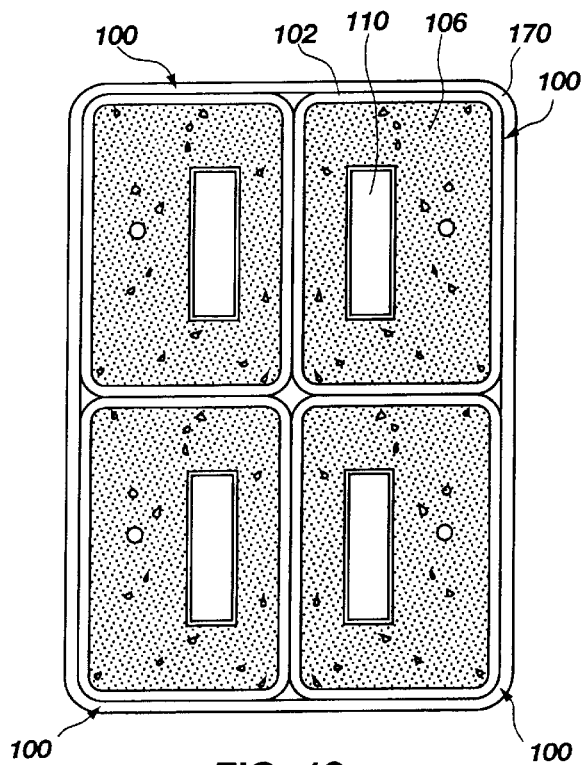

Turning now to FIGS. 16–19, use of a brace-side member 130 of a nonrigid connection apparatus according to the present invention with a plurality of seismic braces 100 is depicted. In FIG. 16, end plate 132 of brace-side member 130 is depicted as having yielding cores 110 of at least two seismic braces 100 secured thereto. Support collar 170 surrounds the adjacent end 103, 104 of exterior shell 102 of each seismic brace 100. FIG. 17 depicts a multi-brace embodiment that includes two seismic braces 100 with yielding cores 110 that are in a mutually parallel arrangement. FIG. 18 shows another multi-brace embodiment that includes three seismic braces 100 and 100' that are arranged in a linear fashion. FIG. 19 illustrates yet another multi-brace embodiment that includes four seismic braces 100 in a two-by-two arrangement.

Multi-brace embodiments of the present invention are not limited to the depicted nonrigid connection apparatus 120, but may also be used with other embodiments of nonrigid connection apparatus that incorporate teachings of the present invention. Moreover, while each of the seismic braces 100, 100' shown in FIGS. 16–19 includes an exterior shell 102 within which a yielding core 110 and a surrounding containment 106 are disposed, other types of seismic braces may also be secured to brace-side member 130 without departing from the scope of the present invention. In addition, it is within the scope of the present invention to secure two or more different types of seismic braces to the same brace-side member (e.g., brace-side member 130) of a nonrigid connection apparatus (e.g., nonrigid connection apparatus 120 (FIG. 5)) incorporating teachings of the present invention.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Moreover, features from different embodiments of the invention may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A seismic brace, comprising:
   an elongate, substantially hollow exterior shell;
   a buckling-limiting element within said exterior shell;
   at least one yielding core including:
   a central region located centrally within said buckling-limiting element and at least partially spaced apart therefrom; and two end regions at opposite ends of said central region, said two end regions extending beyond ends of said buckling-limiting element and said exterior shell;

at least one nonrigid connection element at at least one end region of said two end regions of said at least one yielding core; and a support collar laterally surrounding at least a portion of a length of said at least one end region and including:

a first end secured to said at least one nonrigid connection element; and a second end overlapping at least an end portion of said exterior shell.

2. The seismic brace of claim 1, wherein said at least one yielding core comprises a substantially planar member.

3. The seismic brace of claim 1, wherein each end region of said two end regions of said at least one yielding core is substantially planar.

4. The seismic brace of claim 1, wherein said at least one nonrigid connection element comprises at least one end region of said two end regions of said at least one yielding core.

5. The seismic brace of claim 1, wherein said at least one nonrigid connection element is secured to at least one end region of said two end regions of said at least one yielding core.

6. The seismic brace of claim 5, wherein said at least one nonrigid connection element comprises:

an end plate secured to said at least one end region of said at least one yielding core; and a plurality of substantially planar members extending from said end plate and oriented substantially perpendicular to said end plate and substantially parallel to one another.

7. The seismic brace of claim 6, wherein each substantially planar member of said plurality of substantially planar members includes an aperture formed therethrough, each said aperture being in substantial alignment with apertures of each other substantially planar member of said plurality of substantially planar members.

8. The seismic brace of claim 7, further comprising:

an elongate coupling element configured to be received within apertures of each of said plurality of substantially planar members and within an aperture of at least one complementary connection element secured to a member of a steel structural frame so as to pivotally secure at least one end of the seismic brace to said steel structural frame.

9. The seismic brace of claim 1, comprising a plurality of elongate, substantially hollow exterior shells, each including a buckling-limiting element and at least one yielding core therein.

* * * * *